(12) United States Patent
Damon et al.

(10) Patent No.: US 9,229,972 B2
(45) Date of Patent: Jan. 5, 2016

(54) SYSTEMS AND METHODS FOR CONTENT COLLECTION VALIDATION

(71) Applicant: Massachusetts Mutual Life Insurance Company, Springfield, MA (US)

(72) Inventors: Kent D. Damon, West Springfield, MA (US); Palak P. Shah, Lawrenceville, GA (US); Ronald E. Gendron, Jr., Easthampton, MA (US)

(73) Assignee: Massachusetts Mutual Life Insurance Group, Springfield, MA (US)

( * ) Notice: Subject to any disclaimer, the term of this patent is extended or adjusted under 35 U.S.C. 154(b) by 472 days.

(21) Appl. No.: 13/621,536

(22) Filed: Sep. 17, 2012

(65) Prior Publication Data

US 2013/0073525 A1    Mar. 21, 2013

Related U.S. Application Data

(60) Provisional application No. 61/573,966, filed on Sep. 15, 2011.

(51) Int. Cl.
*G06F 17/30* (2006.01)
*G06F 11/07* (2006.01)

(52) U.S. Cl.
CPC ...... *G06F 17/30371* (2013.01); *G06F 11/0751* (2013.01); *G06F 11/0706* (2013.01); *G06F 17/30011* (2013.01)

(58) Field of Classification Search
USPC .......................................... 707/691
See application file for complete search history.

(56) References Cited

U.S. PATENT DOCUMENTS

| | | | |
|---|---|---|---|
| 7,617,206 B1 * | 11/2009 | Hu et al. | 1/1 |
| 8,484,511 B2 * | 7/2013 | Tidwell et al. | 714/15 |
| 2005/0267892 A1 * | 12/2005 | Patrick et al. | 707/10 |
| 2007/0150709 A1 * | 6/2007 | Easton et al. | 712/224 |
| 2008/0301296 A1 * | 12/2008 | York | 709/225 |
| 2010/0070893 A1 * | 3/2010 | Schreck et al. | 715/764 |
| 2010/0082621 A1 * | 4/2010 | Krivopaltsev et al. | 707/736 |
| 2011/0246427 A1 * | 10/2011 | Modak et al. | 707/653 |
| 2012/0005155 A1 * | 1/2012 | Lynch et al. | 707/608 |
| 2012/0311111 A1 * | 12/2012 | Frew et al. | 709/221 |

* cited by examiner

*Primary Examiner* — Sherief Badawi
*Assistant Examiner* — Christopher J Raab
(74) *Attorney, Agent, or Firm* — Mintz Levin Cohn Ferris Glovsky and Popeo, P.C.

(57) ABSTRACT

Electronic data file and content capturing systems and methods enable enhanced accessibility and reduced complexity for clients managing large volumes of digital data files. According to one aspect, a system and method provided for validation and tracking of content collection tasks. According to another aspect, systems and methods are disclosed for error management through integrated interfaces that are capable of interacting with and correcting the results of content collection tasks.

18 Claims, 11 Drawing Sheets

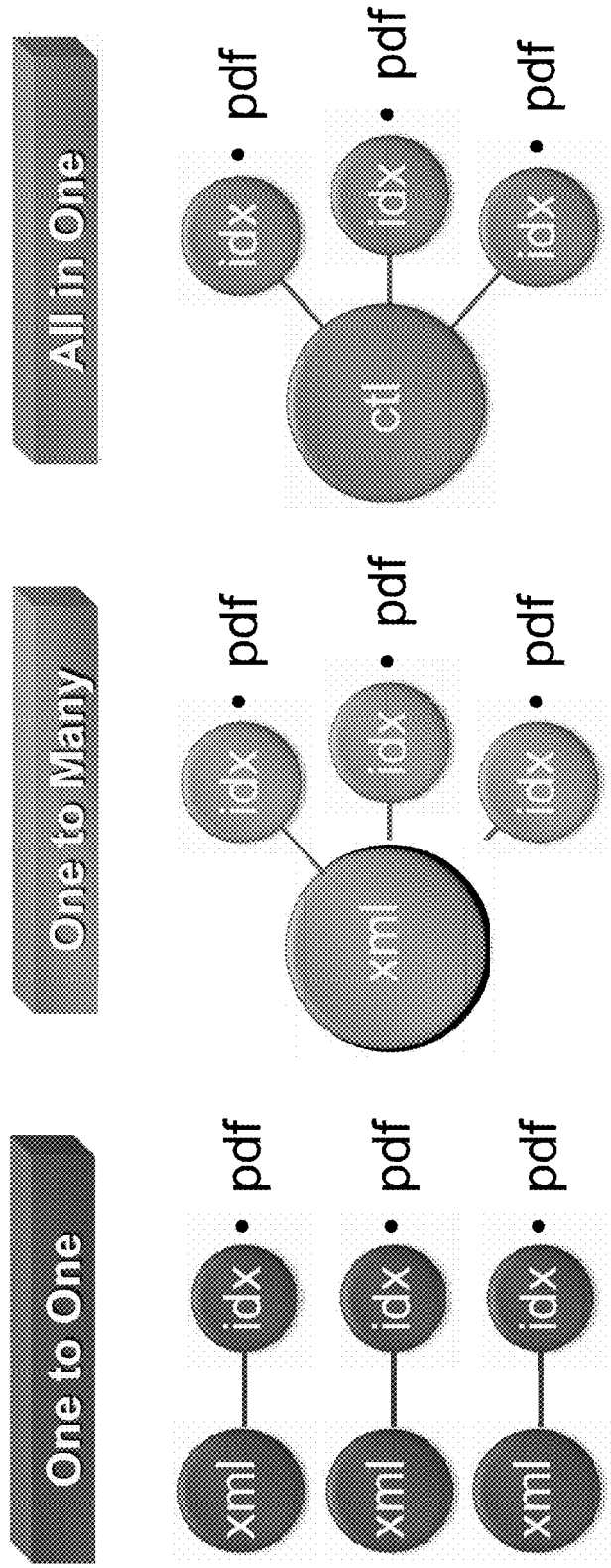

FIG. 6A

| | Filtering Interface | | | |
|---|---|---|---|---|
| In Process Error Status — 604 | | | | |
| Pre-Validation Status | Post-Validation Status | # of Ctl Files | Total Ctl Rec Count | Total Pre-Success |
| Total Pre-Fail | Total Post-Success | Total Post-Fail | | |
| Non-Critical Error Status — 606 | | | | |
| Pre-Validation Status | Post-Validation Status | # of Ctl Files | Total Ctl Rec Count | Total Pre-Success |
| Total Pre-Fail | Total Post-Success | Total Post-Fail | | |
| Critical Error Status — 608 | | | | |
| Pre-Validation Status | Post-Validation Status | # of Ctl Files | Total Ctl Rec Count | Total Pre-Success |
| Total Pre-Fail | Total Post-Success | Total Post-Fail | | |
| All Status — 610 | | | | |
| Pre-Validation Status | Post-Validation Status | # of Ctl Files | Total Ctl Rec Count | Total Pre-Success |
| Total Pre-Fail | Total Post-Success | Total Post-Fail | | |

602A, 612

SYSTEMS AND METHODS FOR CONTENT COLLECTION VALIDATION

CROSS REFERENCE TO RELATED APPLICATION

This application claims the benefit under 35 U.S.C. 119(e) of U.S. Provisional Application No. 61/573,966, filed on Sep. 15, 2011, which is hereby incorporated by reference in its entirety.

BACKGROUND

Embodiments of the present subject matter relate to electronic document and file management systems and methods.

Electronic data and content capturing systems enable enhanced accessibility and reduced complexity for clients managing large volumes of data files. Content capturing systems generally increase the flexibility and usability of information while reducing client costs. For example, electronic content capturing systems are generally capable of understanding the information that is located on a client's enterprise servers. This enables, for example, access to the information to appropriate individuals while ensuring that important information is properly classified, retained, and preserved. Content capturing systems may also enable archiving of data from different sources on the client's enterprise servers.

SUMMARY

According to one aspect, a method of validating an electronic content collection task is disclosed. The method includes scanning a designated electronic memory location, detecting a control file, the control file including content control information and having a corresponding index file, verifying the accuracy of the content control information, and modifying at least one parameter of the corresponding index file such that it can be recognized for inclusion within a content collection task if the content control information is accurate.

According to another aspect, a method of validating an electronic content collection task is disclosed which includes scanning a document file extension of at least one document file, the document file having been subject to a content collection task that modifies the document file extension, reading the document file extension, and logging an error in an event log if the document file extension indicates an error in the content collection task.

According to another aspect, a method is disclosed which includes retrieving task-specific content control information from a validation database, the task-specific content control information including information indicative of the status of an electronic content collection task, displaying the task-specific content control information through an electronic interface, receiving an input through the electronic interface, and modifying the status of the content collection task in the validation database based on the received input.

According to another aspect, an apparatus for validating an electronic content collection task is disclosed. The apparatus includes a memory, and a processor operatively coupled to the memory and configured to scan a designated electronic memory location, detect a control file, the control file including content control information and having a corresponding index file, verify the accuracy of the content control information, and modify at least one parameter of the corresponding index file such that it can be recognized for inclusion within a content collection task if the content control information is accurate.

According to another aspect, an apparatus is disclosed which includes a memory, and a processor operatively coupled to the memory and configured to retrieve task-specific content control information from a validation database, the task-specific content control information including information indicative of the status of an electronic content collection task, display the task-specific content control information through an electronic interface, receive an input through the electronic interface, and modify the status of the content collection task in the validation database based on the received input.

According to another aspect, an apparatus for validating an electronic content collection task which includes a memory, and a processor operatively coupled to the memory and configured to scan a document file extension of at least one document file, the document file having been subject to a content collection task that modifies the document file extension, read the document file extension, and log an error in an event log if the document file extension indicates an error in the content collection task.

BRIEF DESCRIPTION OF THE DRAWINGS

FIGS. 3A-3C illustrate examples of index file relationships that may be simultaneously supported by a validation processor according to some embodiments.

FIGS. 6A-6B illustrate examples of a dashboard according to some embodiments.

DETAILED DESCRIPTION OF EMBODIMENTS

In some embodiments, an electronic content capturing system is capable of monitoring content sources, such as electronic feeds from client enterprise systems (e.g., client mainframe, outlook servers, in-house applications) via fileshares. As referred to herein, the term client refers to individuals or entities that are owners or custodians of content that is to be collected. In some applications, each document or file relates to (e.g., is critical to) a client's business. As a result, it is important to account for all documents that are processed using the electronic capturing system.

Conventional content capturing systems generally lack validation capabilities that are capable of monitoring the collection of each document that is collected, logging errors at different stages of the collection procedure, and interfacing with client systems and support capabilities to correct errors. These validation functions are important for supporting critical content collection in which documents and indices (e.g., all documents and indices) should be accounted for.

In some embodiments, a validation system is configured to interface with an electronic content capturing system to validate one or more content capturing tasks. The validation system is configured to, for example, confirm that the content capturing system has received the entire task, that the metadata associated with the document and files to be captured is complete and/or is formatted correctly, and/or that all of the documents or files have been collected (e.g., "ingested") by the content collection system within an expected duration. In some embodiments, the validation system is configured to maintain and update a status of each content collection task as well as maintain an error report or log regarding errors that relate to the document or file to be collected or that were encountered during an attempt to collect a document or file.

In some embodiments, the validation system is structured as a Control—Index—Document paradigm, such that document collection is managed and monitored appropriately. The validation system, according to some embodiments, may also be capable of use with index files and schema that are associated with various formats, such as XML index files and XML schema. In some embodiments, the validation system functions include verification that documents that are to be collected actually exist, and/or verification that the documents were successfully collected or ingested by the content collection system.

In some embodiments, the validation system is configured to log and track each collection task in a database. In the event of an error, the validation system may be configured to notify client or enterprise content management (ECM) support staff. In some embodiments, the validation system includes an interface that allows ECM support staff to monitor the content collection process, and configure each process by project or task route.

Figure 1:
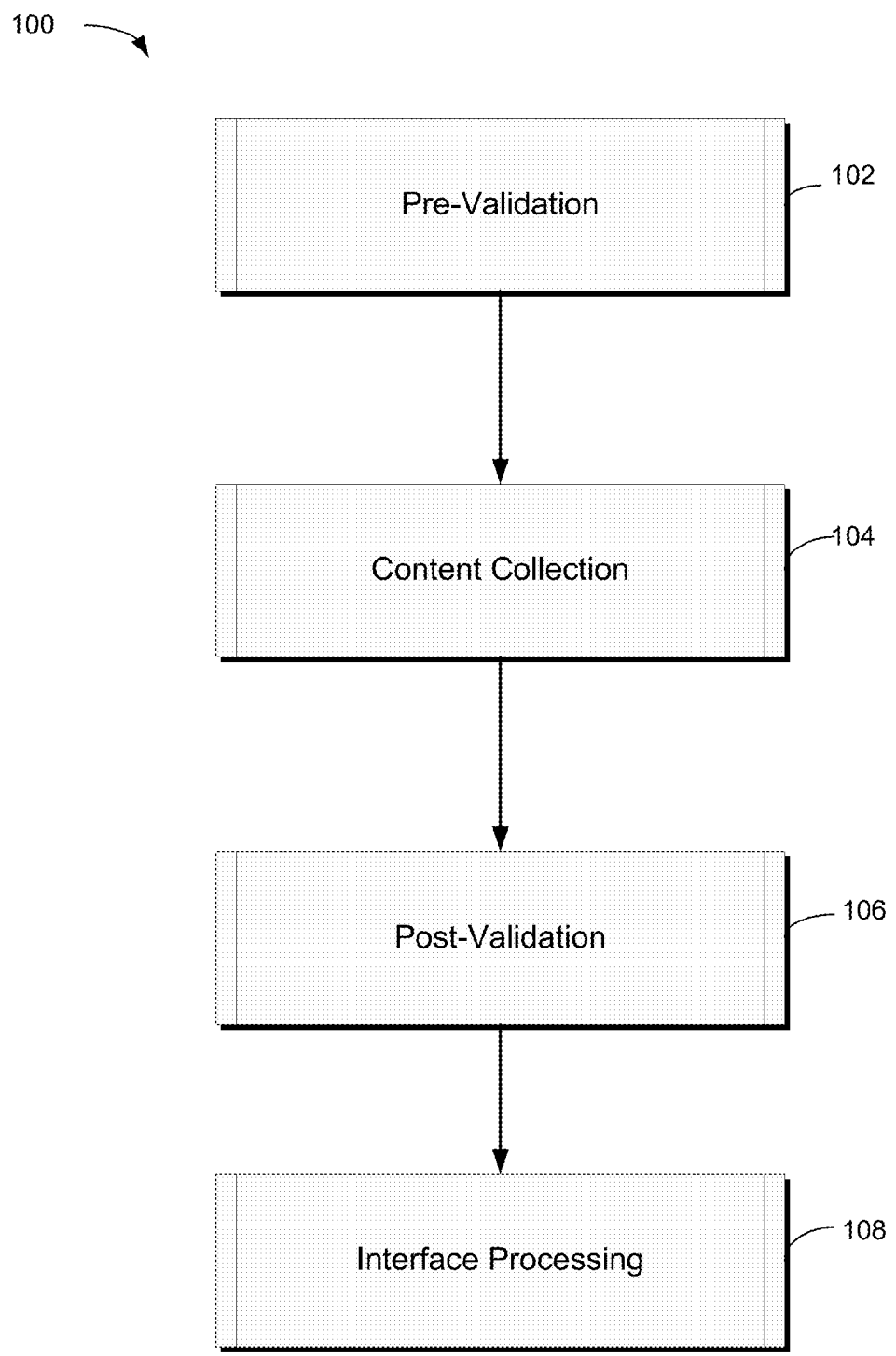
FIG. 1 is a flowchart of a content collection method including validation according to some embodiments.

FIG. 1 is a flowchart of a content collection method 100 including validation according to some embodiments. As shown in FIG. 1, the method 100 includes a pre-validation sub-process as shown in block 102. As will be described in greater detail with reference to FIG. 2 below, client data that is to be collected may be stored in fileshare memory location that is monitored by a content collection and validation system. The pre-validation sub-process may include validation of document counts, index file layouts, and metadata that is included in the fileshare memory. In some embodiments, the pre-validation sub-process logs information and pre-validation errors in a validation database. The method 100 also includes a content collection sub-process as shown in block 104. The content collection sub-process includes collection or ingestion of documents or other electronic content, and modification of file extensions to index files to reflect a successful or unsuccessful collection routine. The method 100 also includes a post-validation sub-process as shown in block 106. The post-validation sub-process includes validation of successful document or file collection routines, generation of logs corresponding to post-validation and content collection errors encountered, and notification to clients of pre-validation errors that were previously encountered. The method 100 also includes an interface processing sub-routine as shown in block 108. The interface processing sub-routine includes displaying task status, support notes, and links to support documentation as well as allowing support staff to edit individual content collection tasks. The interface processing sub-routine may also generate content collection statistics related to any number or subset of content collection tasks. Examples of the pre-validation sub-process, the content collection sub-process, the post-validation sub-process and the interface processing sub-routine will be described with reference to FIGS. 4A-4C, 5A-5C, and 6A-6B below.

Figure 2:
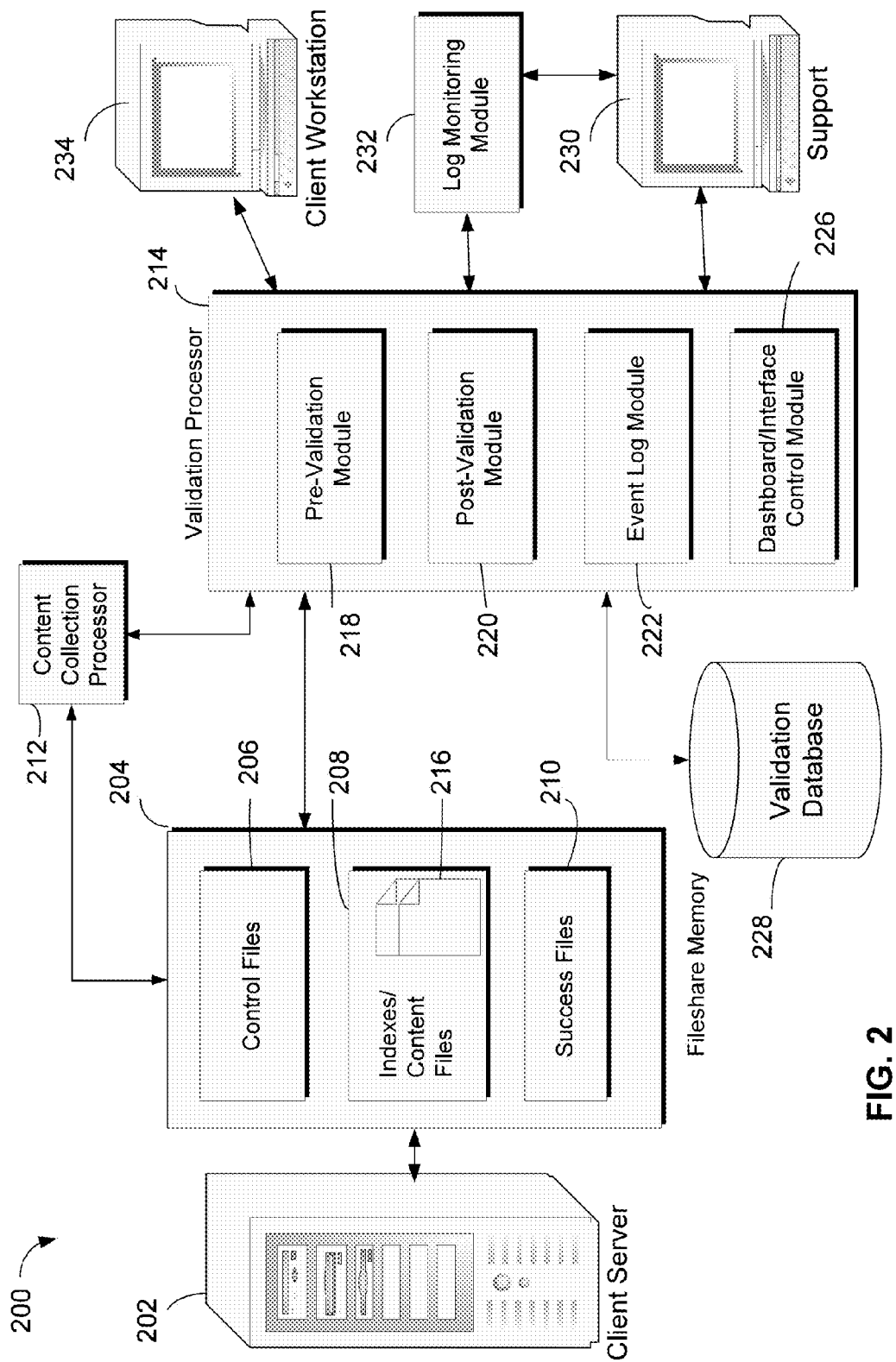
FIG. 2 illustrates a functional block diagram of a validation and content collection system according to some embodiments.

FIG. 2 illustrates a functional block diagram of a validation and content collection system 200 according to some embodiments. As shown in FIG. 2, the system 200 includes a client server 202 in communication with a fileshare memory 204. For example, the client server may include one or more client fileshares. While shown separately, the fileshare memory 204 may also be located within the client server 202. The fileshare memory 204 includes folders for control files 206, indexes/content files 208, and success files 210, which are accessible by a content collection processor 212 and a validation processor 214. The control files 206 and index files 208 are populated by the client server 202 and correspond to electronic content, such as documents 216, that is to be collected by the content collection processor 212. As will be described in greater detail below with reference to FIG. 4A, the success folders 210 include control files that are associated with content that has been successfully pre-validated by the validation processor 214.

The validation processor 214 includes a pre-validation module 218, a post-validation module 220, an event log module 222, and a dashboard/interface control module 224. The operation of each of the modules 218, 220, 222, and 224 will be described in greater detail with reference to FIGS. 4A-4C below. The validation processor 214 is configured to communicate with and modify a validation database 226 which maintains a current status of each content collection task. The validation processor 214 is also in communication with a support terminal 230, a log monitoring module 232, and a client workstation 234 in order to communicate results of the validation process and to efficiently handle error occurrences.

While shown as separate processors in FIG. 2, in some embodiments, the content collection processor 212 and the validation processor 214 may be incorporated in a single processor. Other variations and implementations of the processing architecture may also be used.

The validation processor 214 may be configured to support a variety of platforms and file types. For example, in some embodiments, the validation processor 214 is configured to support multiple index file relationships. FIGS. 3A-3C illustrate examples of index file relationships that may be simultaneously supported by a validation processor 214 according to some embodiments. The file types supported by the validation processor 214 may include a one-to-one client generated index file (xml) to validation index file (idx) relationship as shown in FIG. 3A, a one-to-many client generated index file (xml) to validation index file (idx) relationship as shown in FIG. 3B, or an all in one client generated control file (ctl) that is split into multiple validation index files (idx) as shown in FIG. 3C. In some embodiments, the validation processor 214 is configured to process project specific configurations of index files that are generated by the client server which may include, for example, particular XML coded index files. Table 1 below illustrates some examples of various fields and their associated descriptions which may be varied according to project specific configurations.

TABLE 1

| Field | Description |
| --- | --- |
| IndexWithEmbeddedControlFile | May be used for "All in One" control files. If not specified, the default may be set to "False." "True" if the control and index files are combined. "False" otherwise. |

TABLE 1-continued

| Field | Description |
| --- | --- |
| TriggerFileExtension | Indicates the extension of the control file.<br>If not specified, the default may be set to "ctl."<br>May be used when IndexWithEmbeddedControlFile is set to "True."<br>List the extension of the combined control and index file name.<br>Example: "xml" |
| OneToManyIndexes | May be used for "One to Many" index files.<br>If not specified, the default may be set to "False."<br>May be set to "True" for passing a single index file for a list of documents in a single trigger/control file (as opposed to a separate index file for each document). |
| IndexFileSplitTag | May be used when value for OneToManyIndexes tag is set to "True."<br>Enter the xml tag value to use when splitting a single index file with a list of tags per document into individual xml files for each document.<br>Example: <Doc> |
| DirToMonitorForCtl | Universal Naming Convention (UNC) path<br>Specifies where the Pre-Validation program should monitor for the trigger/control file. |
| ConsecutiveCtlErr | If not specified, a default number may be set (e.g., "5").<br>Specifies the number of control file(s) that can encounter an error in a run before stopping the program from processing any new control files for this task.<br>To stop the program on a first encountered error, set the value to "0.", |
| IndexFile_Xpath | Specifies the XML Xpath where the index file location will be found in the control file.<br>Example: /Control/IndexFiles/File/Path. |
| RecordCount_Xpath | Specifies the XML Xpath where the record count for the number of indexes will be found in the control file.<br>Example: /Control/IndexFiles/File/RecordCount. |
| ContentFile_Xpath | Specifies the XML Xpath where the content file location will be found in the index file.<br>Example: /FILETAG/DOC/ImagePath. |
| ContinueOnCtlOutOfBalanceFlag | If not specified, the default may be set to "False."<br>Set to "True" to continue processing the control file even if the index file count from the control file does not match the count of index files in the index directory.<br>Set to "False" to stop processing the control file if the index file count from control file does not match the count of index files in the index directory. |
| MissingContentFilesLimit | If not specified, a default may be set (e.g., "0").<br>Specifies the limit for number of missing content file(s) before stopping the control file from processing further.<br>To stop the program on first missing content set the value to "0." |
| ctl_Success | Specifies the UNC path to which the Post-Validation process will move the control file upon successful processing |
| ctl_Failed | Specifies the UNC path where the Post-Validation process will create the IngestionProcessInDisableMode.txt file when the process needs to be put in disabled mode.<br>Disabled mode applies to that task route/task only.<br>May be set to the same path as DirToMonitorForCtl. |
| DisableProcessFile | If not specified, a default may be set (e.g., "IngestionProcessInDisableMode.txt").<br>Name of the file that will be created to disable the process from running again when the count of error control files reaches the limit set in the configuration file.<br>The process will not restart for the task until the file is manually deleted. |
| PreValidationIdxFileExt | If not specified, a default may be set (e.g., "xml").<br>Specifies the index file extension that will be provided by Business System Area. |
| PostValidationIdxFileExt | If not specified, a default may be set (e.g., "idx").<br>Specifies the index file extension that should be applied once the Pre-Validation process has successfully completed validating the index file(s).<br>Set to the same extension for which Document Collection Tool (e.g., ICC) monitors. |
| EmailTo | If not specified, a default may be set.<br>List the Microsoft Exchange Mlist of the Business System Area that will be providing the data.<br>Additional e-mail addresses can be added separated by commas. |
| EmailFrom | |
| LogsLocation | Specifies the UNC path where the error and status logs are located. |
| ErrLogName | |
| StatusLogName | If not specified, a default may be set (e.g., "StatusLog.txt.")<br>Name for the status log, where for each control file processed |

TABLE 1-continued

| Field | Description |
|---|---|
| | system may log 1) the date/time, 2) name of the control file, 3) if the control file processing was a success or a failure, 4) the number of index file(s) from control file(s), and/or 5) the number of index file(s) from the index directory. The date will may be appended to the name to create a new log for each day. |
| ValidateXml | If not specified, the default may be set to "True." If OneToManyIndexes = "False": Set to "True" to validate the index file against an associated XML xsd schema validation file. Set to "False" to not validate the index file against an associated XML xsd schema validation file. If OneToManyIndexes = "True": When index file is One to Many, the index file is validated against the XML xsd schema validation file before index file is split into individual index files. Therefore, set to "False" to not validate the index file again after the split of the index files. |
| ValidateAllIndexFiles | If not specified, the default may be set to "False." False = Stop validating the index files once the InvalidIndexFilesLimit is reached. True = Continue validating the index files even if the InvalidIndexFilesLimit is reached. However, if the invalid index file limit is reached then do not rename the index file success, for example, do not rename .xml to .idx. |
| ValidateXmlAfterSplit | If not specified, the default may be set to "False." For one to many and combined control/index file: False = Validate the XML file before split them into individual index file. True = Split the index file into individual index file without validating. If this tag is set to True then set the ValidateXml to True to validate the index file after the split. |
| InvalidIndexFilesLimit | If not specified, the default may be set to "0." Specifies the limit for count of invalid index file(s) before stopping the control file from processing further. To stop the program on first invalid index file put the value "0." |
| xsdFile | Used if ValidateXml = "True" Or OneToManyIndexes = "True" Specifies the path where the XML xsd schema validation file for this ingestion is located. |
| RetryLimit | If not specified, a default may be set (e.g., 5). Specifies the maximum number of times the Post-Validation process will check to see if the document collection tool is finished before flagging the ingestion as an error. |
| WaitTime | If not specified, a default value may be set (e.g., "250"). Specifies time in millisecond used to calculate the time Post-Validation should wait before checking if the ingestion is complete. Multiplied times the number of documents (e.g., for 100 documents and a WaitTime = 250, a total wait time of 25 seconds is used). Value may be set to any integer. |
| ObjectStore | Name of the Object Store in which document collection tool will store the ingested content. |
| DocClass | Name of the Document Class in which document collection tool will store the ingested content. |
| RCServer | Name of the document collection tool server that will process the tasks. |
| ECMErrorResolutionLimit | If not specified, a default may be set (e.g., "7200" or 2 hours) Maximum time in seconds the Support Staff has to update the status of a task having an error in the Pre-Validation database, or fix the error, before an error notification email is sent. |

| Hours | Seconds |
|---|---|
| 2 | 7200 |
| 4 | 14400 |
| 8 | 28800 |
| 12 | 43200 |
| 24 | 86400 |
| 36 | 129600 |
| 48 | 172800 |
| 72 | 259200 |

| Field | Description |
|---|---|
| BusSpecificRootTag_Xpath | If the business area has information sent in the control file which they want to be returned in the log file generated by Post-Validation process, then that information is enclosed inside a tag. For example:. <BusinessTag> <BusTag1>BusTag1Test1</BusTag1> <BusTag2>BusTag2Test1</BusTag2> |

TABLE 1-continued

| Field | Description |
|---|---|
| | </BusinessTag><br>The Pre-Validation process may extract the information from the control file, writes it to the database, then the Post-Validation process includes it in the log file. |
| ErrorIDPrefix | Indicates the criticality of the ingestion tasks.<br>If not specified, a default value may be set (e.g., "7.")<br>Value specified is used as a prefix for the error number.<br>For example, use 6 for non-critical ingestions where error notification should be sent by e-mail to local client support (e.g., IT).<br>Use 7 for critical ingestions where error notification by pager is sent to Support Staff/System Administrator. |
| RootPathToArchiveFldr | If data should be archived to another folder then the root location of the archived folder may be provided. |
| IngestionIdentifier_Xpath | Xpath to where the Ingestion Run Identifier value is passed in the index file. |
| IgnoreZeroRecordCountControlFile | Set to "False" if the Pre-Validation process should error when a control file has a record count of zero.<br>Set to "True" if the Pre-Validation process should ignore control files with a record count of zero and not throw an error. |
| StaticIndexFilePath | To be used for "One to Many" or combined index/control index file type only.<br>Pass the path that needs to be appended to the file name for where index file is located. |
| StaticContentFilePath | To be used for "One to Many" or combined index/control index file type only.<br>Pass the path that needs to be appended to the file name for where index file is located. |

Figure 4A:
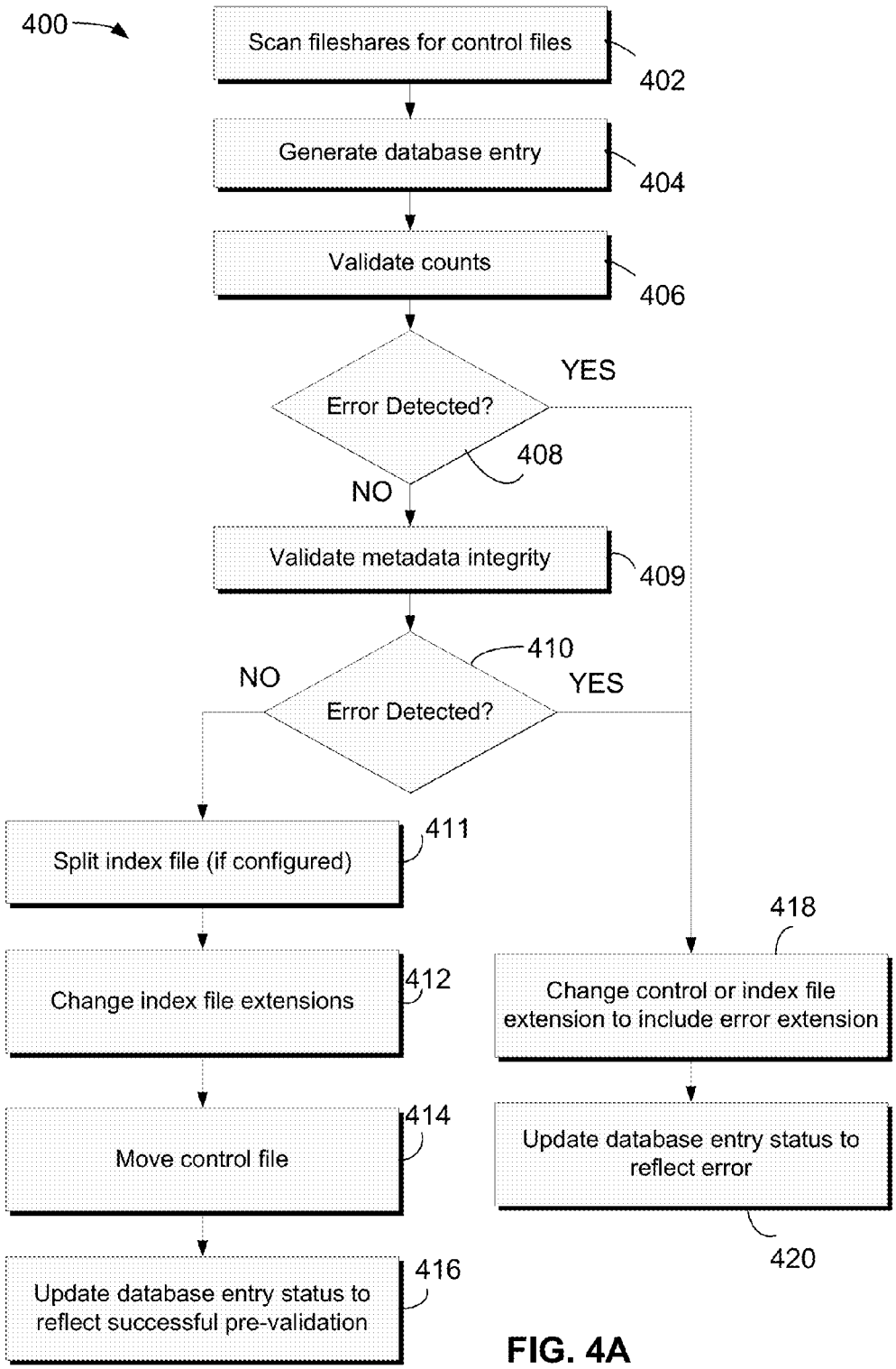
FIG. 4A is a flowchart of a pre-validation method according to some embodiments.
Figure 4B:
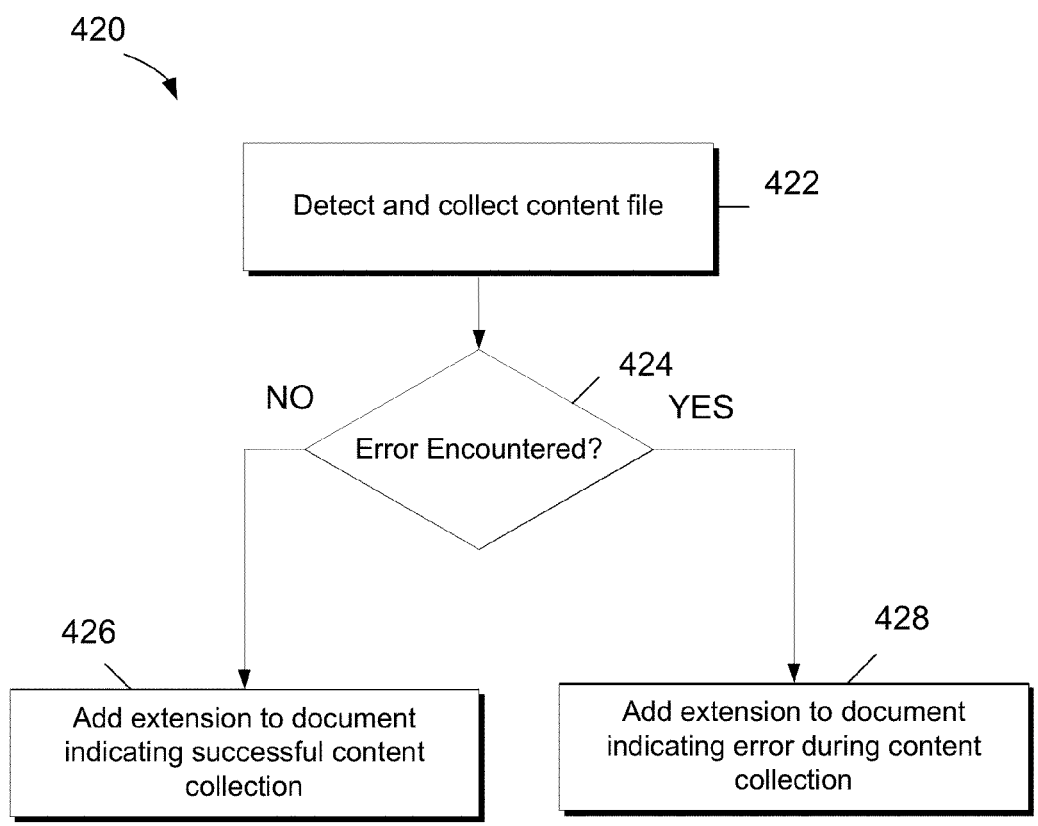
FIG. 4B is a flowchart of a content collection method according to some embodiments.
Figure 4C:
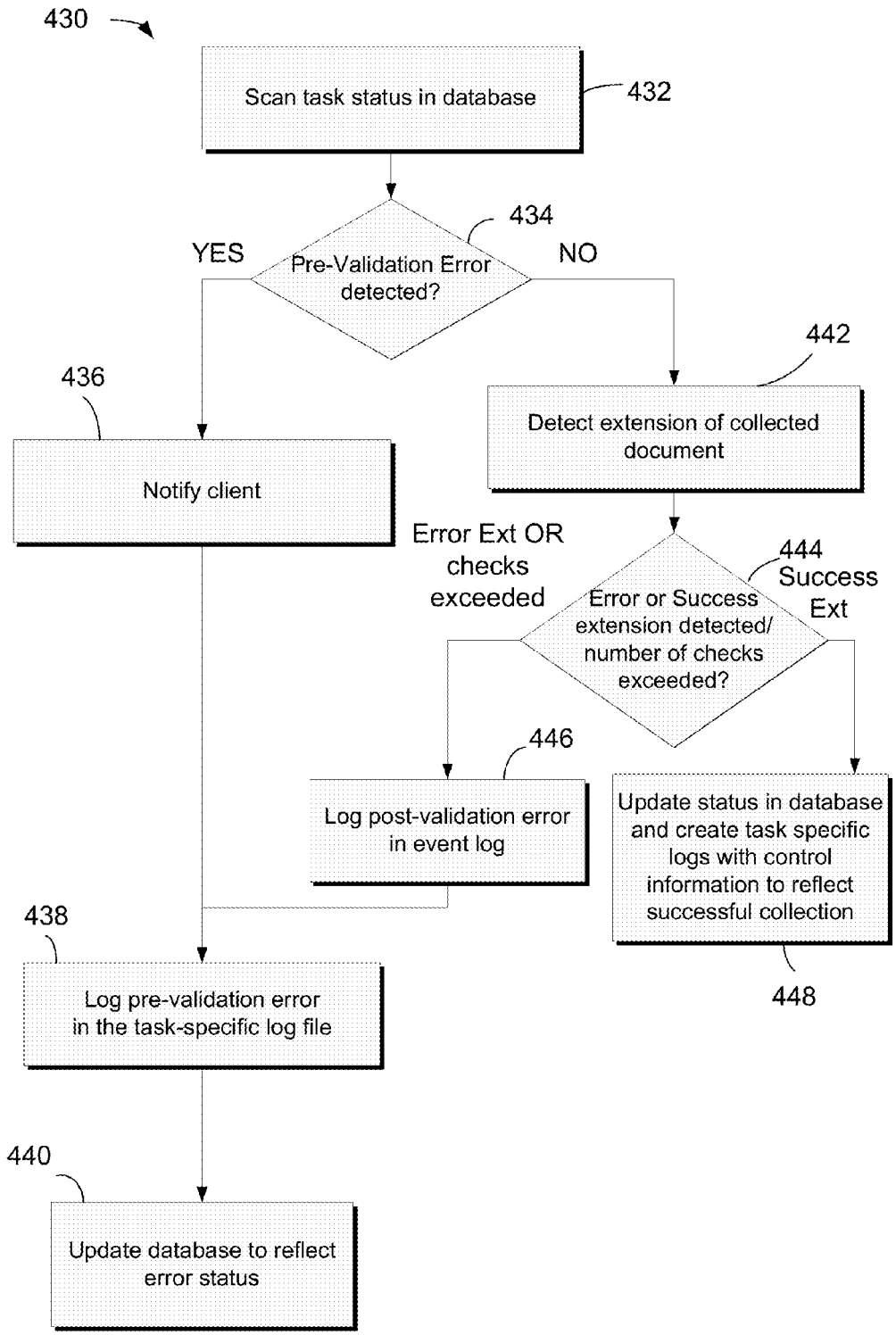
FIG. 4C is a flowchart of a post-validation method according to some embodiments.

Some examples of the functionality of the validation processor 214 and the content collection processor 212 are shown in FIGS. 4A-4C. FIG. 4A is a flowchart of a pre-validation method 400 according to some embodiments. The pre-validation process 400 may be performed by the pre-validation module 218 discussed above with reference to FIG. 2.

As shown in FIG. 4A, the pre-validation process 400 includes scanning fileshares for control files as shown in block 402. For example, as discussed above with reference to FIG. 2, the client server 202 may be configured to write content, index, and control files to monitored fileshares which are located in fileshare memory 204. The validation processor 214, through operation of the pre-validation module 218, is configured to monitor, for example, control files 206 located in fileshare memory 204. The detection of a control file in the fileshare memory 204 triggers other operations of the pre-validation process 400.

The pre-validation process 400 generates a database entry as shown in block 404 in order to track and update the status of a content collection task. For example, as shown in FIG. 2, the pre-validation module 218 is configured to communicate with the validation database 228 in order to add an entry related to a content collection task. At block 406, the pre-validation process 400 validates the number of files or documents (counts) associated with the content. For example, the pre-validation module 218 may be configured to compare the number of indexes noted in the control file 206 associated with the content against the actual number of indexes and documents that are located in the corresponding index/content file 208.

As shown in decision block 408, the pre-validation process 400 may determine whether a document/index count error has been detected during pre-validation. If an error has not been detected, the process may also validate metadata integrity by confirming that each index file points to a document, that the index file properties exist, contain values, and follow the proper format (e.g., date format) as shown in block 409.

As shown in decision block 410, the pre-validation process 400 may determine whether an error has been detected with metadata integrity during pre-validation. If an error has not been detected, the control file/index file is split into individual index files (if configured) as shown in block 411. For example, as discussed above with reference to FIG. 3C, if a client server 202 generates an all-in-one index file, the pre-validation module 218 may split the all-in-one client generated index file to generate multiple index files that are to be recognized by the content collection processor 212. In some embodiments, the content collection tool is configured to recognize specified index file extensions (e.g., ".idx"). These index file extensions may be set based on task specific configurations as indicated above in Table 1. Following a successful pre-validation, the file extensions are changed to index extensions (e.g., from ".xml" to ".idx") as shown in block 412 in order to allow recognition of content by the content collection tool. In addition, the associated control file is moved from the control files 206 to the success files 210 within the fileshare memory 204 as shown in block 414. Further, the database entry in validation database 228 corresponding to the task is updated to reflect a successful pre-validation procedure as shown in block 416.

The pre-validation tool advantageously maintains compatibility with conventional content collection file formatting. For example, for a conventional content collection system in which clients provide index files having a ".xml" extension, the pre-validation tool can be configured to recognize the ".xml" and trigger a pre-validation process. Configuration of the content collection tool can also be changed such that the ".xml" format does not trigger a content collection operation by the content collection tool. Rather, the content collection tool can be configured to search for an index file extension that is set by the pre-validation tool (e.g., ".idx"), which reflects a pre-validated index file that relates to a content collection task.

With reference to FIG. 4A, if an error has been detected by the pre-validation process in decision block 410 (e.g., corrupt index file, missing values, etc.), the extension of one of the control file and/or one or more of the index files associated with the content is changed (e.g., to a ".err" extension) as shown in block 418 in order to alert the post-validation process of the error as will be discussed in greater detail with reference to FIG. 4C. The type of error encountered may dictate which of the control file and/or the one or more index file extensions are to be changed to reflect the error. For example, if an error relates to the number of documents that are provided relative to the number of documents referenced in the control file, the control file extension may be changed to reflect that a control file error was encountered. Following detection of an error, the database entry status of the validation database 228 is updated to reflect the error that is encountered during pre-validation as shown in block 420.

FIG. 4B is a flowchart of a content collection method 420 according to some embodiments. The content collection method 420 may be performed by the content collection processor 212 discussed above with reference to FIG. 2. The content collection method 420 includes detecting and collecting content files as shown in block 422. For example, the content collection processor 212 is configured to detect index files in the fileshare memory 204 having the ".idx" extension which is set by the pre-validation process, and is configured to collect the corresponding content, such as documents 216. The collected content, may be, for example, archived in order to conserve client resources and/or automatically distributed to particular users. Content collection method 420 also includes a determination of whether an error was encountered for a particular content collection task as shown in decision block 424. Examples of content collection errors may include errors that are encountered as a result of validating the content of each index file. For example, an index file may generally include a particular task route (e.g., content storage location) and/or data type (e.g., letter, email, or the like). If the task route is invalid and/or the referenced document data type does not match the actual document data type, an error is detected by the content collection tool.

As shown in FIG. 4B, if an error is not encountered during content collection, an extension is added to the document 216 (e.g., ".SUCCESS") indicating successful content collection as shown in block 426. If an error is encountered during content collection, an extension reflecting an error (e.g., ".ERROR") is added to the document 216 as shown in block 428.

FIG. 4C is a flowchart of a post-validation method 430 according to some embodiments. The post-validation method 430 may be performed by the post-validation module 220 discussed above with reference to FIG. 2. As shown in block 432, the method includes scanning the unprocessed job or task status entries in the validation database 228.

If the post-validation module 220 detects that a database entry in validation database 228 is set to an error status, the post-validation module 220 determines that the corresponding task encountered an error during pre-validation. As shown in decision block 434, the method includes determining whether one of these pre-validation errors has been detected. If an error has been detected, a notification is sent to the client to correct the error as shown in block 436. Examples of client notifications will be described in greater detail with reference to FIGS. 5A-5C below. With reference to FIG. 2, the post-validation module 220 is configured to communicate with a designated client workstation 234 (e.g., IT department, designated email address, or the like). The client workstation 234 is enabled to correct the errors and remove the ".err" extension from the corresponding control file. Following removal of the ".err" extension, the pre-validation module 220 is re-triggered to pre-validate the content and change the index file extension for recognition by the content collection processor 212. The process may then proceed normally through content collection and post-validation.

Detection of a pre-validation error also results in a pre-validation error being logged in a task-specific log file in the task fileshare as shown in block 438. For example, the post-validation module 220 may write a task-specific log file to fileshare memory 204 in order to log the error event. Further, if the corresponding database entry in the validation database 228 does not already reflect an error status, the corresponding database entry is updated to reflect the error status as shown in block 440.

If an error is not detected at decision block 434 (e.g., the task status indicates that the Pre-Validation process was successful), the extensions of the collected documents are detected to determine whether an error was encountered during document collection, as shown in block 442. For example, the post-validation module 220 is configured to check whether a collected document has a ".ERROR" extension, or whether all collected documents have a ".SUCCESS" extension. If a collected document includes neither extension, the post-validation module 220 may determine that content collection is still pending and may continue to periodically check the document's extension.

At decision block 444, the method determines whether an error extension is detected or whether a predetermined number of checks have been exceeded. If neither event occurs, and if the extension of the collected document reflects a successful document collection, the status in the validation database 228 is updated to reflect a successful content collection process as shown in block 448. Furthermore, a successful status is logged in a task-specific log file in the task fileshare as shown in block 448. For example, the post-validation module 220 may write a task-specific log file to fileshare memory 204 in order to log the error event. However, if an error extension is detected or the number of checks is exceeded, a post-validation error is logged in the event log as shown in block 446. For example, as discussed above, the pre-validation module 220 may communicate with the event log module 222 in order to log the error event. Detection of a post-validation error also results in a post-validation error being logged in a job-specific log file in the job fileshare as shown in block 438. For example, the post-validation module 220 may write a job-specific log file to fileshare memory block 204 in order to log the error event. Further, if the corresponding database entry in the validation database 228 does not already reflect an error status, the corresponding database entry is updated to reflect the error status as shown in block 440.

With reference to FIG. 2, the event log module 222 may be continuously monitored by the log monitoring module 232. As the log monitoring module 232 encounters error events that are logged in the event log module, the log monitoring module 232 is configured to communicate with system support 230 (e.g., ECM support) in order to correct the errors. System support 230 may then troubleshoot and/or correct errors through communication with the dashboard/interface control module 226 that is incorporated in the validation processor 214. Following correction, system support 230 may also be enabled to remove the ".ERROR" extensions from document files, triggering the content collection processor 212 to ingest or collect the documents as a new task. As discussed above, successful collection of the documents results in the addition of the ".SUCCESS" extension by the content collection processor 212, which can then be validated by the post-validation module 220.

Figure 5A:
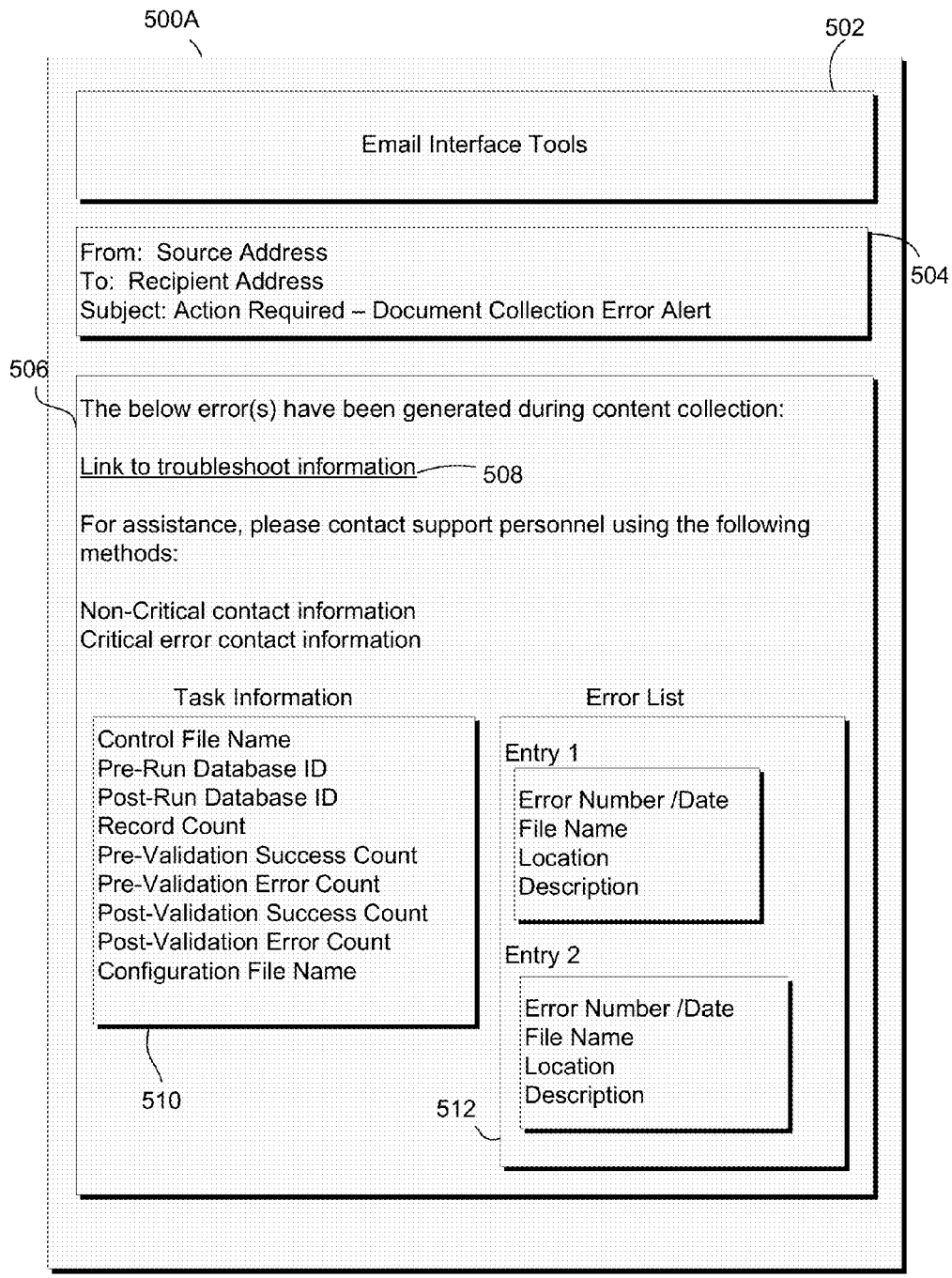
FIGS. 5A-5C illustrate examples of notifications which can be sent to a client workstation or support team according to some embodiments.
Figure 5B:
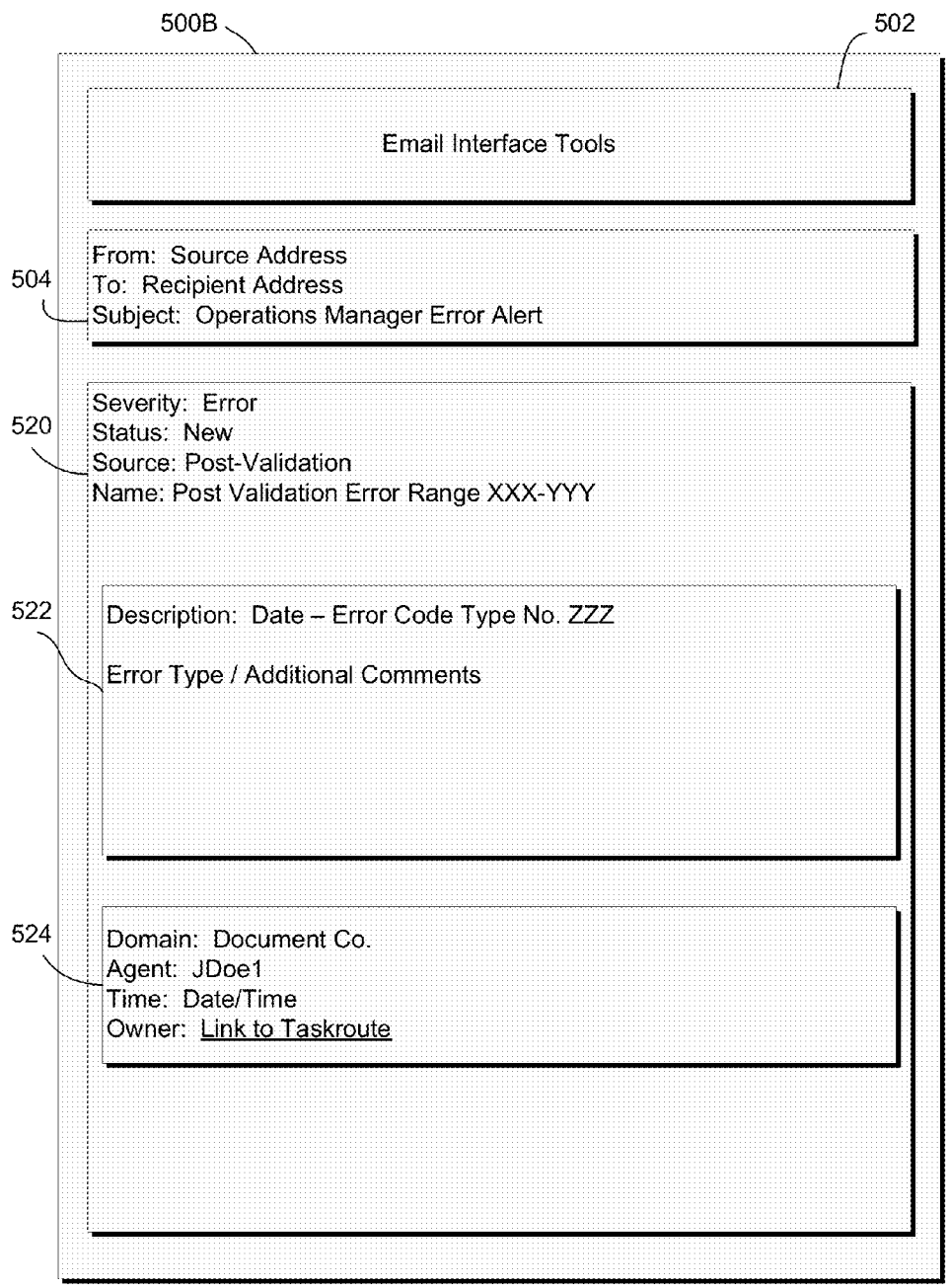
Figure 5C:
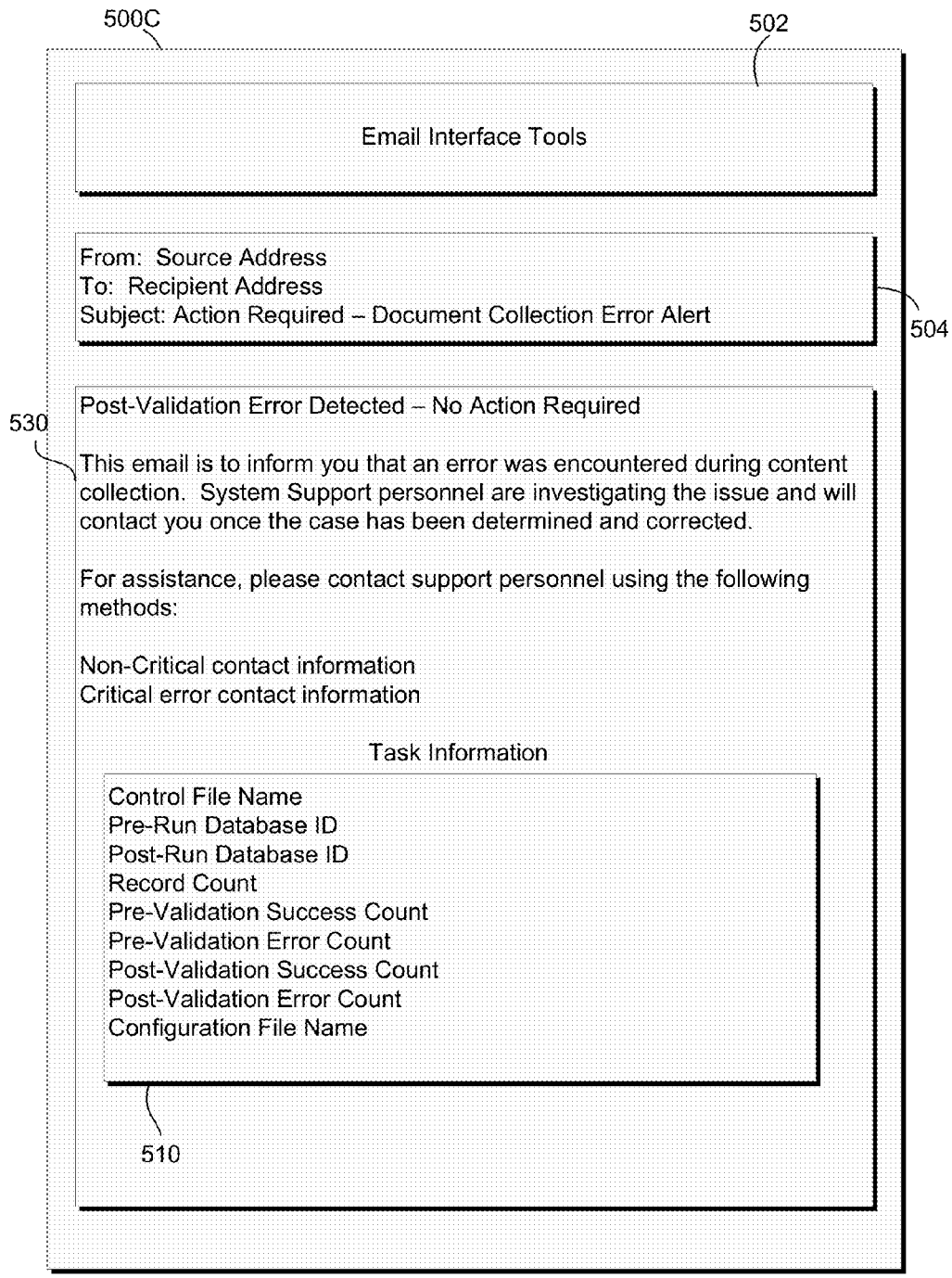

In some embodiments, the Validation Processor 214 can be configured at the project level to prepend various error prefixes to the error codes in the event log module 222. For example, an error with a prefix of "6" could indicate a non-critical error, whereas an error with a prefix of "7" could indicate a critical error. External monitoring tools are used to monitor the logs for these prefixes and notify support staff in the event of errors FIGS. 5A-5C illustrate examples of notifications which can be sent to a client workstation or support team according to some embodiments. As shown in FIG. 5A, an email may be generated to notify designated recipients when pre-validation errors occur. The email notification 500A can include interface tools 502 (e.g., reply, replay all, forward, etc.), and an addressing field 504 which identifies the source address, recipient address and subject of the email. In the example shown in FIG. 5A, an email is sent to a to indicate a pre-validation error. The email may be sent to a client's designated recipient email address (e.g., a client IT support email address corresponding to client workstation 232). The email body 506 indicates the details of the error that was encountered and includes a link 508 to troubleshoot information that can be of assistance to the recipient for resolving the error. The email may also include support services contact information, which may be classified by error criticality. The email body 506 also includes task information 510, such as the control file name, pre-run database ID, post-run database ID, record count (e.g., number of documents in task), pre-validation success count, pre-validation error count, post-validation success count, post-validation error count, and a configuration file name. The email body 506 also includes an error list 512 which includes separate error entries that reflect the specific errors that were encountered for the associated task. Each error entry may include information identifying the error, such as error number, the date and time the error was encountered, the file name that encountered the error, the location of the file in the fileshare, and a description of the error including any actions which occurred as a result of encountering the error.

FIG. 5B illustrates an example of an email notification 500B which can be sent when a post-validation error has been encountered. In some embodiments, the email notification 500B shown in FIG. 5B may be sent automatically to content collection support personnel (e.g., System Support 230) through monitoring of the event log module 222 by the log monitoring module 232. The email notification 500B includes email interface tools 502 and addressing fields 504 as discussed above with reference to FIG. 5A. The email body 520 may indicate the severity or type of notification (e.g., Error), the status of the error, the source of the error (e.g., post-validation), and an indication of the code-range of the post-validation error. As discussed above, a pre-fix of the code-range may indicate the criticality of the type of error that was encountered. The email body 520 also includes an error specific description 522 which can indicate the date/time of the error, an identifying error-code, an error type, and a detailed description of the error. The email body 520 can also include a source description field 524 which identifies the source domain of the error, the agent (e.g., server) that encountered the error, the time and date the error was encountered, and owner (e.g., repository) of the error which may be in the form of a link to a particular task-route that is affiliated with the document that encountered the error.

FIG. 5C is an example of an email notification 500C which may be sent to a designated recipient when a post-validation error has occurred and has not been resolved within a predetermined time by content collection system support personnel. Similar to the email notification 500A of FIG. 5A, the email notification 500C includes email interface tools 502 and addressing field 504. The email body 530 also includes task information 510 which is similar to that described above with reference to FIG. 5A. The email notification 500C informs the recipient that an error was encountered and is in the process of being resolved. Contact information, which may be specific to the criticality of the error, may also be provided as shown in FIG. 5C.

Figure 6B:
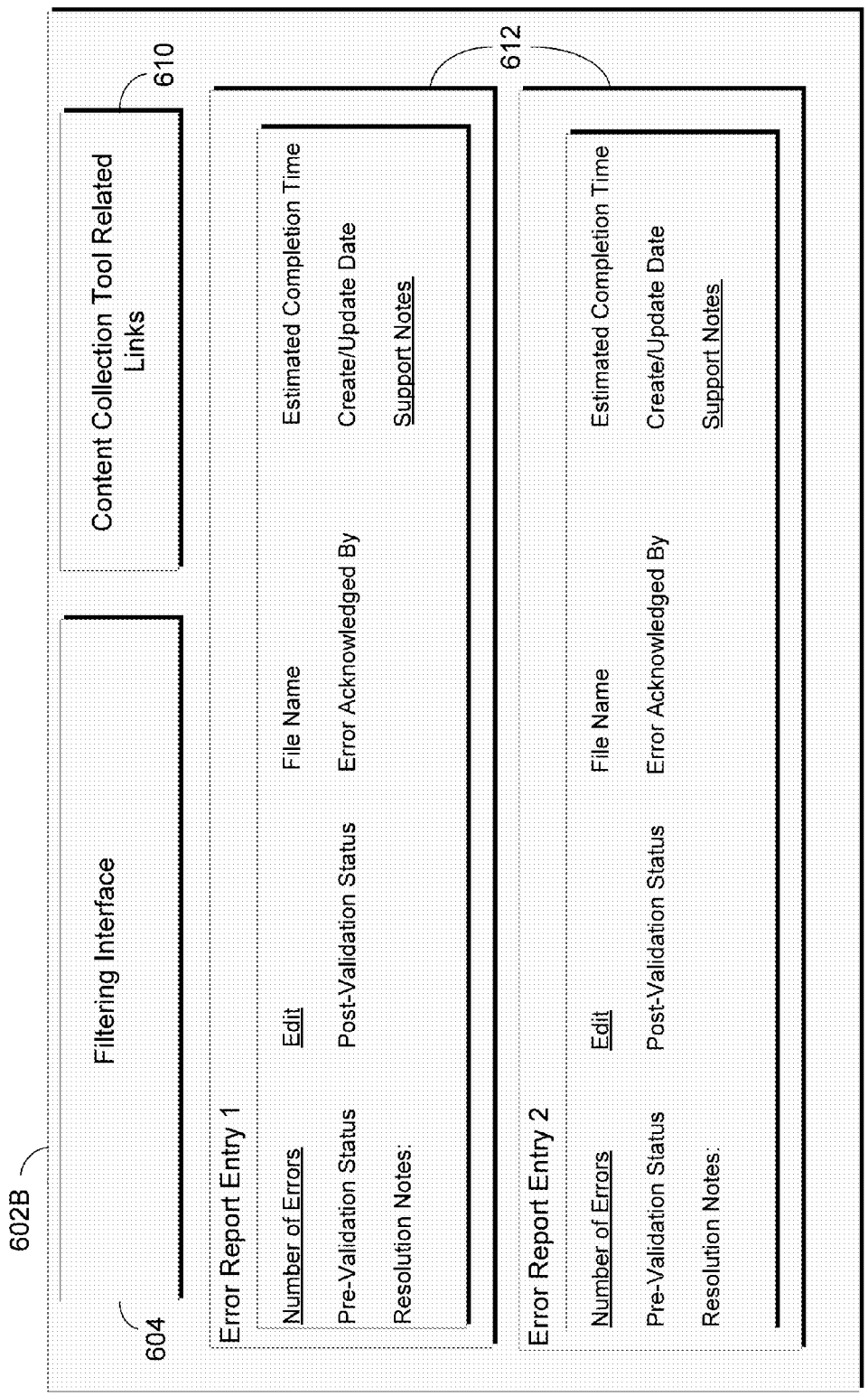

FIGS. 6A-6B illustrate examples of a dashboard 602A, 602B according to some embodiments. As shown in FIG. 6A, the dashboard 602A can display the status and statistics related to all content collection tasks together, and may classify each status by customizable groups such as in-process 606, non-critical 608, critical 610, and all errors 612. The dashboard 602A can include a filterable document search field 604, and can also include linked fields within each error entry that provide access to additional information about content collection tasks. Accessing one of the task entries through dashboard 602A and/or searching for particular tasks may link to a corresponding task specific dashboard 602B as shown in FIG. 6B. The task specific dashboard 602B can include information regarding the status of each document within the corresponding task. For example, error entries 612 identify error information pertaining to individual content collection tasks. Within each error entry 612, additional information regarding each error by accessing a designated link associated with the number of errors for the entry. Additional support notes may also be accessed through a designated link corresponding to each entry. The status of the errors may be editable by accessing corresponding editing links following correction by support staff.

While not shown in FIG. 6B, the dashboard 602B can also include tallies including information regarding all content collection tasks. In some embodiments, support personnel may also bulk modify the error status of jobs in the database when a large number of jobs have the same error.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium or memory. Computer-readable media include both non-transitory computer storage media and communication media including any medium that facilitates transfer of a computer program. A storage medium may be any available media that can be accessed by a computer. By way of example, and not limitation, such computer-readable media can include non-transitory computer-readable media including RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium can include a communication signal path. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

The system may include various modules as discussed above. As can be appreciated by one of ordinary skill in the art, each of the modules may include one or more of a variety of sub routines, procedures, definitional statements and macros. Each of the modules may be separately compiled and linked into a single executable program. Therefore, the description of each of the modules is used for convenience to describe the functionality of the disclosed embodiments. Thus, the processes that are undergone by each of the modules may be redistributed to one of the other modules, combined together in a single module, or made available in, for example, a shareable dynamic link library.

The system may be used in connection with various operating systems such as Linux®, UNIX® or Microsoft Windows®. The system may be written in any conventional programming language such as C, C++, BASIC, Pascal, or Java, and ran under a conventional operating system. The system may also be written using interpreted languages such as Visual Basic (VB.NET), Perl, Python or Ruby.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A method comprising:
scanning, by at least one processor, a designated electronic memory location to detect a control file populated by a server operatively coupled to the designated electronic memory location, the control file being stored in the designated electronic memory location, the control file including content control information, the control file being associated with an index file populated by the server;
verifying, by the at least one processor, accuracy of the content control information;
modifying, by the at least one processor, at least one parameter of the index file such that the index file can be recognized for inclusion within a content collection task when the content control information is accurate, the content collection task comprising a plurality of stages, each stage of the plurality of stages referring to a different set of one or more actions performed by the at least one processor, the plurality of stages comprising a pre-validation stage and a content collection stage;
generating, by the at least one processor, a notification when the content control information is inaccurate, the notification comprising identifications of a plurality of errors determined during different stages of the content collection task and, for each error of the plurality of errors, an identification of a corresponding stage of the plurality of stages in which the error was determined, the plurality of errors comprising an indexing error, a metadata integrity error, and a content collection error, the indexing error characterizing an inaccurate indexing of data within the content control information, the indexing error occurring during the pre-validation stage, the metadata integrity error characterizing an inaccurate and improper integration of metadata within the content control information, the metadata integrity error occurring during the pre-validation stage, the content collection error characterizing an inaccurate collection of data during the content collection stage; and
sending, by the at least one processor, the notification to the server.

2. The method of claim 1, further comprising verifying accuracy of index file information included in the index file and modifying the at least one parameter of the index file such that the index file can be recognized for inclusion within the content collection task when the content control information and the index file information is accurate.

3. The method of claim 1, wherein:
the at least one parameter comprises an index file extension of the index file; and
the index file is stored in the designated electronic memory location.

4. The method of claim 1, wherein:
the designated memory location is a fileshare memory location;
the at least one processor is a validation processor; and
the control file is collected in the designated electronic memory location by a content collection processor operatively coupled to the validation processor.

5. The method of claim 1, wherein:
the notification is an email comprising a link for troubleshooting at least one error of the plurality of errors in the content control information; and
the server comprises a graphical user interface configured to display the email.

6. The method of claim 1, further comprising: storing content control information specific to the content collection task in a validation database operatively coupled to the at least one processor.

7. A non-transitory computer program product storing instructions that, when executed by at least one programmable processor, cause the at least one programmable processor to perform operations comprising:
scanning a designated electronic memory location to detect a control file populated by a server operatively coupled to the designated electronic memory location, the control file being stored in the designated electronic memory location, the control file including content control information, the control file being associated with an index file populated by the server;
verifying accuracy of the content control information;
modifying at least one parameter of the index file such that the index file can be recognized for inclusion within a content collection task when the content control information is accurate, the content collection task comprising a plurality of stages, each stage of the plurality of stages referring to a different set of one or more actions performed by the at least one programmable processor, the plurality of stages comprising a pre-validation stage and a content collection stage;

generating a notification when the content control information is inaccurate, the notification comprising identifications of a plurality of errors determined during different stages of the content collection task and, for each error of the plurality of errors, an identification of a corresponding stage of the plurality of stages in which the error was determined, the plurality of errors comprising an indexing error, a metadata integrity error, and a content collection error, the indexing error characterizing an inaccurate indexing of data within the content control information, the indexing error occurring during the pre-validation stage, the metadata integrity error characterizing an inaccurate and improper integration of metadata within the content control information, the metadata integrity error occurring during the pre-validation stage, the content collection error characterizing an inaccurate collection of data during the content collection stage; and sending the notification to the server.

8. The non-transitory computer program product of claim 7, wherein the operations further comprise verifying accuracy of index file information included in the index file and modifying the at least one parameter of the index file such that the index file can be recognized for inclusion within the content collection task when the content control information and the index file information is accurate.

9. The non-transitory computer program product of claim 7, wherein:
the at least one parameter comprises an index file extension of the index file; and
the index file is stored in the designated electronic memory location.

10. The non-transitory computer program product of claim 7, wherein:
the designated memory location is a fileshare memory location;
the at least one programmable processor is a validation processor; and
the control file is collected in the designated electronic memory location by a content collection processor operatively coupled to the validation processor.

11. The non-transitory computer program product of claim 7, wherein:
the notification is an email comprising a link for troubleshooting at least one error of the plurality of errors in the content control information; and
the server comprises a graphical user interface configured to display the email.

12. The non-transitory computer program product of claim 7, wherein the operations further comprise storing content control information specific to the content collection task in a validation database operatively coupled to the at least one programmable processor.

13. A system comprising:
at least one programmable processor; and
a machine-readable medium storing instructions that, when executed by the at least one programmable processor, cause the at least one programmable processor to perform operations comprising:
scanning a designated electronic memory location to detect a control file populated by a server operatively coupled to the designated electronic memory location, the control file being stored in the designated electronic memory location, the control file including content control information, the control file being associated with an index file populated by the server;
verifying accuracy of the content control information;
modifying at least one parameter of the index file such that the index file can be recognized for inclusion within a content collection task when the content control information is accurate, the content collection task comprising a plurality of stages, each stage of the plurality of stages referring to a different set of one or more actions performed by the at least one programmable processor, the plurality of stages comprising a pre-validation stage and a content collection stage;
generating a notification when the content control information is inaccurate, the notification comprising identifications of a plurality of errors determined during different stages of the content collection task and, for each error of the plurality of errors, an identification of a corresponding stage of the plurality of stages in which the error was determined, the plurality of errors comprising an indexing error, a metadata integrity error, and a content collection error, the indexing error characterizing an inaccurate indexing of data within the content control information, the indexing error occurring during the pre-validation stage, the metadata integrity error characterizing an inaccurate and improper integration of metadata within the content control information, the metadata integrity error occurring during the pre-validation stage, the content collection error characterizing an inaccurate collection of data during the content collection stage; and
sending the notification to the server.

14. The system of claim 13, wherein the operations further comprise verifying accuracy of index file information included in the index file and modifying the at least one parameter of the index file such that the index file can be recognized for inclusion within the content collection task when the content control information and the index file information is accurate.

15. The system of claim 13, wherein:
the at least one parameter comprises an index file extension of the index file; and
the index file is stored in the designated electronic memory location.

16. The system of claim 13, wherein:
the designated memory location is a fileshare memory location;
the at least one programmable processor is a validation processor; and
the control file is collected in the designated electronic memory location by a content collection processor operatively coupled to the validation processor.

17. The system of claim 13, wherein:
the notification is an email comprising a link for troubleshooting at least one error of the plurality of errors in the content control information; and
the server comprises a graphical user interface configured to display the email.

18. The system of claim 13, wherein the operations further comprise storing content control information specific to the content collection task in a validation database operatively coupled to the at least one programmable processor.

* * * * *